US008238326B2

(12) United States Patent  (10) Patent No.: US 8,238,326 B2
Kant et al.  (45) Date of Patent: Aug. 7, 2012

(54) MAINTAINING CONSISTENT NETWORK CONNECTIONS WHILE MOVING THROUGH WIRELESS NETWORKS

(75) Inventors: Nishi Kant, San Jose, CA (US); Atchuta Rallapalli, San Francisco, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 1702 days.

(21) Appl. No.: 11/234,072

(22) Filed: Sep. 23, 2005

(65) Prior Publication Data

US 2006/0104262 A1  May 18, 2006

Related U.S. Application Data

(60) Provisional application No. 60/629,855, filed on Nov. 18, 2004, provisional application No. 60/705,224, filed on Aug. 3, 2005.

(51) Int. Cl.
*H04L 12/66* (2006.01)
*H04L 12/28* (2006.01)
*H04L 12/56* (2006.01)

(52) U.S. Cl. ........................................ 370/352; 370/401

(58) Field of Classification Search .................. 370/338, 370/401, 352; 455/435.2
See application file for complete search history.

(56) References Cited

U.S. PATENT DOCUMENTS

| 7,151,931 B2 * | 12/2006 | Tsao et al. | 455/435.2 |
| 2003/0147406 A1 * | 8/2003 | Spear et al. | 370/401 |
| 2006/0050667 A1 * | 3/2006 | Verma et al. | 370/338 |

OTHER PUBLICATIONS

Jiang et al., Incorporating proxy services into wide area cellular IP networks, 2001, Wireless Communcations and Mobile Computing, 1:299-312.*

* cited by examiner

*Primary Examiner* — Yuwen Pan
*Assistant Examiner* — Sonia Gay
(74) *Attorney, Agent, or Firm* — DLA Piper LLP; Blake W. Jackson

(57) ABSTRACT

A proxy server provides an anchor point for access network changes in a wireless environment. One example embodiment uses the concept of proxy server in order to preserve a uniform connectivity to a gateway service node while roaming across different networks through a handover mechanism. In one embodiment, the client connects to a proxy server through one access network, and the proxy server manages and keeps track of the user session toward the gateway service node. The client then connects to any packet service network, including Internet, through the proxy. When the client moves from one network to another, it indicates the change to the proxy and proxy, using a handover mechanism, switches the access network while maintaining the user session toward the gateway service node. The handover mechanism involved is efficient, with minimal messaging overhead, and preserves the application layer IP address of the client. Therefore, the data connections do not suffer from interruptions due to roaming through different networks and the service is seamlessly continued.

25 Claims, 5 Drawing Sheets

MAINTAINING CONSISTENT NETWORK CONNECTIONS WHILE MOVING THROUGH WIRELESS NETWORKS

CROSS-REFERENCE TO RELATED APPLICATIONS

This application claims priority from provisional patent application 60/629,855 filed on Nov. 18, 2004, which is hereby incorporated by reference.

This application also claims priority from provisional patent application 60/705,224, filed on Aug. 3, 2005, which is hereby incorporated by reference.

BACKGROUND AND SUMMARY OF THE INVENTION

1. Field of the Invention

The present inventions relate generally to wireless data movement and, more particularly, to how wireless devices maintain consistent network connections when more than one network is present.

2. Background

Wireless networks have evolved from a simple point-to-point link to encompassing different coverage areas at varying data transfer rates. For example, a short ranged network (made up of connectivity devices such as Bluetooth capable devices) provides data rates in excess of 3 Mb/s covering a small room; a medium range network (such as Wi-Fi or 802.11) that provides data rates of 25 Mbps covering a several rooms; a large range network (such as The Global System for Mobile TeleCommunications (GSM)) with cells that provide several hundred kbits/s data rate covering a city; and the largest connectivity devices, satellite networks, provide data coverage for several countries. The multi-mode mobile terminal has capabilities to connect to different networks based on the policies of the user and the network, such as the particular sources that have been purchased or provided. Due to the overlapping of these networks a user can roam through multiple networks during a single session. In all roaming scenarios, the handover mechanism between these hybrid networks is a vital topic.

General Packet Radio Service (GPRS) is a data communication technology that is capable of transferring packet data and signaling in a cost-efficient manner over GSM radio networks while optimizing the use of radio and network resources. The voice traffic and the data packet share the same physical channel, but new logical GPRS radio channels are defined. Data transfer rates up to 171.2 Kbps are possible over GPRS thus enabling mobile data services, like Internet applications, over mobile devices. The data traffic is segregated and sent to a Serving GPRS Support Node (SGSN) node from the BSC. The SGSN node connects to a Gateway GPRS Support Node (GGSN) for communication with external packet data networks. The next generation of this technology is UMTS that provides higher data transfer rates. Typically GPRS and UMTS networks operate over licensed frequencies and are owned by mobile operators. Several entities have created a partnership project called 3GPP that is responsible for defining services, architecture and protocols. These specifications cover wireless access network, core network nodes and interconnection protocols etc.

The Wireless Local Area Network (WLAN) is a wireless extension to Ethernet LAN technologies. The IEEE 802.11 committee has defined several of these standards and named them 802.11b, 802.11g and 802.11a. In WLAN, each service access point (AP) covers a cell. In IEEE 802.11, each single cell is defined as a basic service set (BSS). Several BSSs can form an extended service set (ESS). IEEE 802.11 only defines the communication between the client (referred to also as the mobile terminal (MT) or mobile node (MN)) and access point (AP) (the physical layer and data link layer). The client connects to the AP that has higher signal quality and communicates wirelessly to the AP. The data communication is similar to the wired Ethernet communication except for the physical layer and medium access.

802.11x WLAN technologies, popularly known as the Wi-Fi, have become predominant in the limited mobility wireless data networks due to reasonably higher data transfer rates and affordability of the technology. In fact, 3GPP has come up with a specification (TS 23.234) on how to interwork WLAN with GPRS/UMTS networks. Both these wireless technologies are complimentary in several aspects. Therefore, many operators provide both services, with GPRS for global roaming and Wi-Fi for limited mobility areas popularly known as hotspots. There are several devices that support these dual technologies paving way for pervasive computing. The hotspots are WLAN islands scattered at key geographic locations. The mobile user would be roaming between GPRS coverage area and Wi-Fi coverage area very frequently thus requiring a fast and efficient handover procedure.

To achieve seamless mobility, the client should do fast handover from GPRS network to WLAN or vice versa without interruption. Several methodologies have been proposed for this roaming scenario. Two different methodologies that address this problem are described below.

Background: Mobile IP

Mobile IP (MIP) provides mobility at the network layer thus enabling roaming between different networks. The MIP is specified in Request for Comments (RFC) 3344 (for IPv4) and 3775 (for IPv6) by the Internet Engineering Task Force (IETF) community. MIP defines two nodes, Home Agent (HA) and Foreign Agent (FA). The HA is the coordinating node on the home network of a user. The mobile node communicates to HA node directly, using normal IP routing, when connected to the home network. A Foreign Agent is a node in a MIP network that enables roamed IP users to register on the foreign network. The FA will communicate with the HA (Home Agent) to enable IP data to be transferred between the home IP network and the roamed IP user on the foreign network. Whenever the node is connected on a foreign network, it acquires a care-of-address (COA) and registers with the HA providing the COA. The data packets sent by a correspondent node (CN) destined to the mobile node are captured by HA in the home network and are tunneled to the COA. The packets are decapsulated either at FA or client. When the client roams to another network, it acquires new COA and registers with HA about its new location. Now all the data packets destined to this mobile node are tunneled to the new COA.

One common solution for GPRS and WLAN mobility using MIP is to provide home agent (HA) functionality at the Gateway GPRS Support Node (GGSN). The FA functionality can be at Serving GPRS Support Node (SGSN) for the GPRS network and at the Wireless Gateway (WG) for the Wide Area Local Network (WLAN). Otherwise a co-located Care of Address (COA) can be used if the client supports MIP.

FIG. 1 illustrates this type of communication network. A GGSN 102 is connected to both a SGSN 104 and a WLAN Gateway 106. There is generally a constant connection between the GGSN, SGSN, and WLAN Gateway. A HA 112 is located north of GGSN, which, in this embodiment, means that the HA is connected directly to the GGSN which is connected to the client networks 104 and 106. Clients 108, 110 may connect to the GGSN through either the SGSN or through the WLAN Gateway. The GGSN provides connectivity to an IP network such as the Internet. When the client is connected through GPRS network, it acquires the remote IP address from the GGSN. This GGSN-assigned IP address works as the COA and the client registers this COA to the HA. When the client moves into WLAN area and connected to the WLAN, it acquires the IP address from either NAS or WLAN gateway. This IP address is different from the GGSN-assigned IP address and it serves as a new COA. The client registers this IP address to the HA. Since the client's home address remains the same and only the COA is changed, the mobility can be supported with the service continuity.

Though MIP provides mobility between these two networks the handover is not seamless because of the time delay from the point the client moves to a different network and the registration with the HA is completed. During this phase, HA sends all packets for client towards the old COA and these packets could be lost. This is a problem when roaming from WLAN to GPRS network since the WLAN connection is gone and any packets sent over this network will not reach the client. The other drawback of this solution is the triangle routing of the data packets (the packets from client to the correspondent node (CN) are directly routed while the packets from CN are sent to HA first and then tunneled to client) that is inherent in the MIP. Route optimization methods have been proposed to overcome this issue. Finally, there are 3GPP services that are valuable to operators and useful to end-users. Such services are accessible at the GGSN and Mobile IP layer makes this work complicated. In other words, since the anchor point is HA and all the packets should be decapsulated at HA, the service differentiation using APN (Access point name) at GGSN is not simple. GGSN also can perform some services, e.g. content-based billing, and this gets more complicated because of MIP tunneling. The MIP packet overhead in all the packets (both GPRS and WLAN) and message overhead for registration is one drawback, too.

Background: Inter-SGSN Like Handover Approach

The WLAN coverage cell is small compared to the cell of the GSM area. One method of integrating these two networks is by treating the WLAN as a smaller network within the GSM network. Several Access Points (AP) connecting to a WG represent a small coverage area. In "Method and System for Transparently and Securely Interconnecting a WLAN Radio Access Network into a GPRS/GSM Core Network." it has been demonstrated how the WG could function in a manner similar to the SGSN and thereby providing an interconnection into GPRS core network. The roaming scenario is just like an Inter-SGSN Routing Update process described in the GPRS specification. When the client roams in to WLAN area, the client sends the Routing Area Update request to the WG. To retrieve all the MM and PDP contexts for the client, WG requests these contexts from previous serving SGSN. After the contexts are transferred to WG, SGSN starts forwarding all the packets to WG, if it receives any packets from GGSN. The WG now, based on the information of the existing GPRS PDP context, sends an Update PDP Context to the GGSN that will transfer the existing GPRS session to this network.

The GGSN sends a packet data protocol/mobility management context standby command to the old SGSN. The message is to ask the SGSN to hold the PDP/MM context till the client comes back to the UMTS or detaches. The packets are sent over the WLAN through WG to the GGSN and the IP address of the session still remains the same. When the client roams back to the GPRS network, a Routing Area (RA) update procedure is triggered that activates the old GPRS session. The handover delay in this process is lower than that of the Mobile IP method described earlier. Due to the tight integrated nature of this solution, the LAN based architecture on the WLAN needs several changes to accommodate this solution. Especially WG should support most of standard GPRS SGSN functionalities. Also, the client should be intelligent enough to obtain the GPRS session parameters and sends it to the WG. Since it is not an open architecture solution, this method is not preferred.

Maintaining Consistent Network Connections While Moving Through Wireless Networks Handover between different wireless access networks (e.g., a GPRS access network and a WLAN access network) is facilitated by a proxy server (also referred to herein as a proxy server or proxy, which can optionally be combined with a global wireless gateway node) preferably adapted to communicate with other nodes of a network, such as nodes of a GPRS network and/or a WLAN. (Note that hereinafter, the term SGSN may be referred to a server GSN, and a GGSN can be referred to as a gateway GSN.)

In one example class of embodiments, when a multifunction (e.g., dual mode) client is operating as a GPRS client (i.e., it is using a GPRS access network), the DNS server is configured to resolve the selected APN to the proxy server's high-level address, so that all control traffic is sent to the proxy server, preferably prior to being sent to another node, such as a GGSN.

In embodiments wherein the user equipment or mobile node accesses the network via a GPRS access network, the user traffic may flow from an SGSN through the proxy server to a GGSN, or the user traffic can flow directly to the GGSN, without first passing through the proxy server, therefore reducing the number of hops for user data. When a handover to another type of access network occurs (e.g., to a WLAN access network) preferred embodiments implement one of at least two options: if only control traffic was anchored at the proxy server, then the proxy server can update the GGSN to switch the user traffic from SGSN to the proxy server. GGSN would typically reflect this in its accounting. Alternatively, if both control and user traffic were anchored at the proxy server, the proxy server can do a simple update to the GGSN for accounting purposes, since data and control flow are already established with the GGSN through proxy server.

In either case, on handover (e.g., from a GPRS to a WLAN access network) the client preferably establishes a tunnel to the proxy server as its wireless gateway. When the handover happens, the proxy server already has all the control information of the GPRS session, because the control traffic passes through the proxy server, preferably no matter what access network is used.

In embodiments wherein the user equipment uses a WLAN access network, it is preferred that both control and user traffic are routed through the proxy server, and the proxy server acts as a wireless gateway server.

Traffic on the "access side" of the proxy server can thus take different paths, depending on the access network used by the user equipment. Traffic on the other side of the proxy server (e.g., toward a GGSN or other node) is preferably unchanged when the user equipment changes access networks. This efficient means of handover between access networks is facilitated by preferred embodiments' use of the proxy server to receive control traffic for the session.

In preferred embodiments, the present innovations are implemented using an address mapping mechanism that is internal to the proxy server and another node, such as a DNS server (as part of a GPRS network). The DNS server, which normally points traffic to a GGSN, instead points to the proxy server. The proxy server includes an address mapping mechanism that points in turn to the GGSN. As stated above, either control traffic or both control and user traffic are proxied in this way, depending on the specific implementation.

Thus the present innovations provide, in preferred embodiments, efficient handover between two types of access networks, retaining at least part of the connection to a target or destination network.

The proxy server thus allows the change in route to be invisible to the GGSN. Consistent connections may therefore be maintained with the same application-layer address and optimized even when data is routed through varying networks.

The disclosed inventions, in various embodiments, provide at least the following advantages:
- Each application's data connections are not perturbed by movement, since changes in the client's local IP address can be concealed from at least some processes and the same application layer IP address can be used across different access networks.
- Complexities due to access changes are HIDDEN from applications.
- The GGSN can still operate normally, and does not have to know what the proxy server is doing, therefore supporting the handover with no or minimum changes to the existing GGSN node itself
- The client can still operate normally, and does not have to know about the proxy server, therefore supporting the handover with no or minimum changes to the existing client itself.
- If the DNS server for a selected APN does not point to the proxy server, then conventional operation will occur, and the rest of the network is not impacted.
- The handover mechanisms enabled by the proxy server and found in some embodiments of the inventions preserve the address of the client with minimal messaging overhead.
- Consistent connections may therefore be maintained and optimized even when data is routed through varying networks.
- A centralized proxy server can optionally maintain records for billing and usage purposes for all varying services (especially in the case where the proxy server is handling both data and control).
- A centralized proxy server can optimize traffic flow over a wide range of networks.
- A centralized proxy server can maintain a unique identifier while a client travels through different ISP's

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovations of the present application will be described with particular reference to the presently preferred embodiment (by way of example, and not of limitation).

The present innovations can be implemented in a number of different contexts. For purposes of clarity, specific examples are used to describe preferred embodiments, namely GPRS access networks and WLAN access networks are used by user equipment in the context of a wireless network, such as a cellular telephone network. These examples are not intended to limit the potential application or scope of the present innovations. The scope of these innovations is described in the claims.

Figure 1:
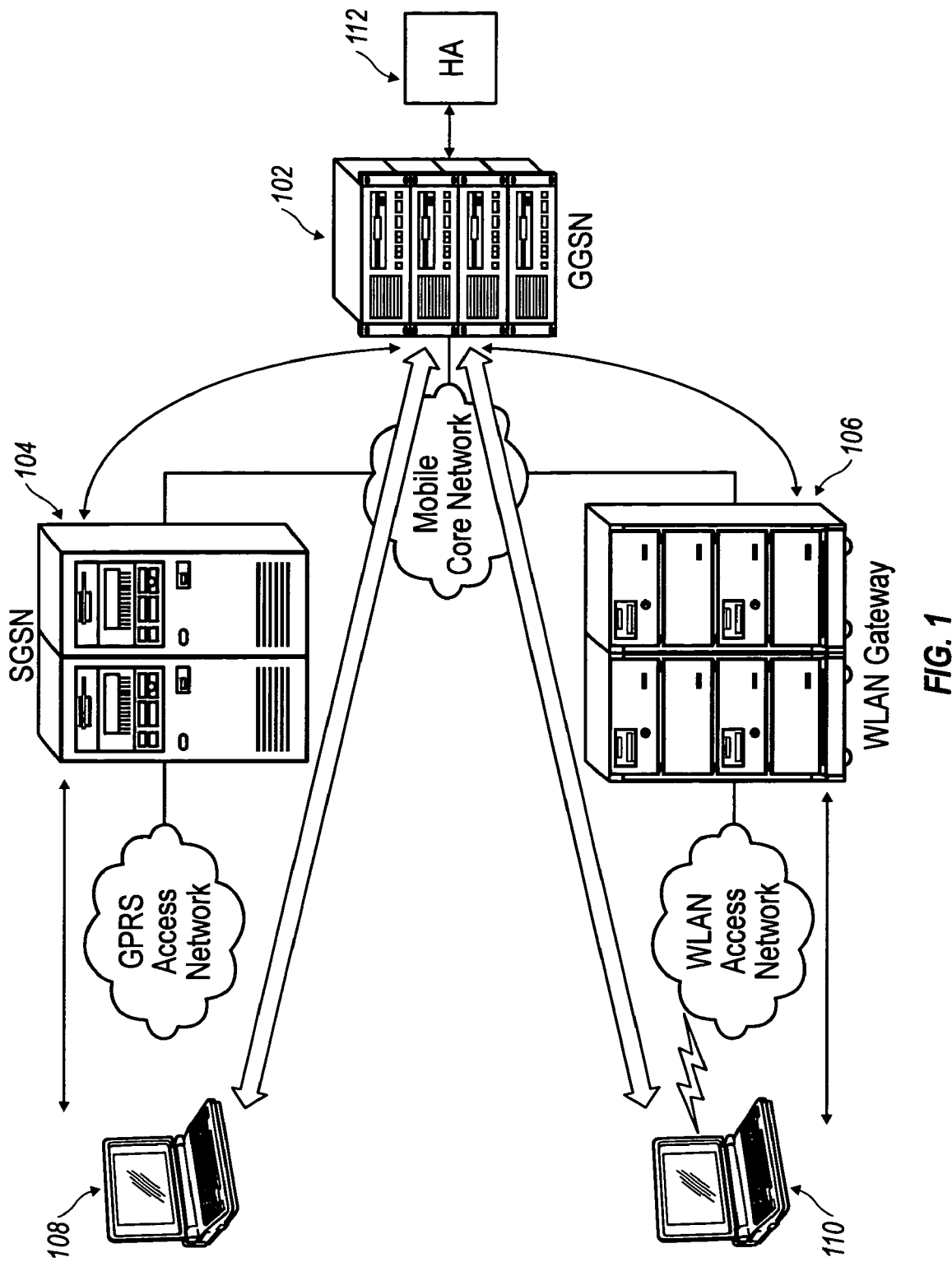
FIG. 1 shows an example overview of mobile networks with two possible access networks.
Figure 2:
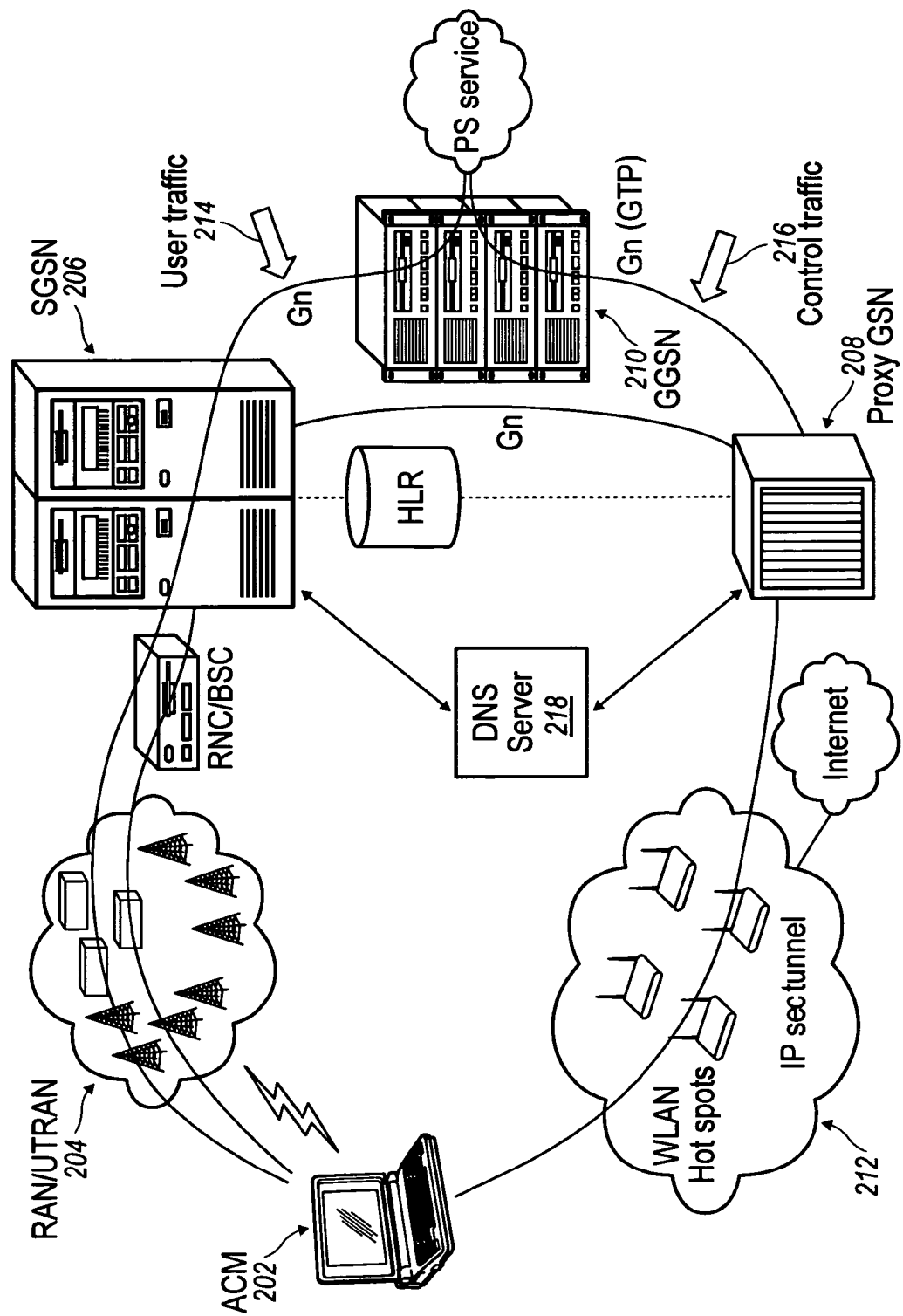
FIG. 2 shows an example implementation consistent with a preferred embodiment.

FIG. 2 shows an overview of an example implementation consistent with a preferred embodiment. In this example, a GPRS access network 204 is used by a user equipment 202 such as a cellular telephone. For example, a GPRS access network signal is detected by the user equipment, but a WLAN signal is not detected. Therefore, the user connects using the GPRS access network. The GPRS access network 204 sends both control traffic 216 and user traffic 214 to the SGSN 206. The SGSN performs several functions, including GPRS authentication, APN selection, and DNS resolution of the APN (which points to the proxy server 208 rather than directly to the GGSN 210), which preferably causes the proxy server 208 to appear as the GGSN. A DNS server 218 is connected to both the SGSN and the proxy server. In this preferred embodiment, the protocol used is RADIUS, but other protocols could be used in other embodiments.

At the proxy server 208, APN translation is performed using a mapping mechanism to resolve the GGSN 210. In this example, the proxy server 208 appears to the GGSN 210 as the SGSN 206. Upon creating the connection to GGSN, proxy server can specify the route for both control and user traffic. If the proxy server anchors all the control and user traffic, all the traffic is routed from SGSN through proxy server to GGSN. If the proxy server anchors the control traffic only, proxy server specifies the SGSN as the user traffic end point to GGSN, resulting in the control traffic flowing from SGSN through proxy server to GGSN while user traffic flowing from SGSN to GGSN directly. The proxy server in this example acts as an anchor point for the control traffic 216 while the user traffic is routed directly to GGSN 214.

When a user equipment 202 roams within range of another access network, such as a WLAN access network 212, a handover process begins. The proxy server 208 checks that a session already exists for that user and updates the PDP context for the new access network. The control and user traffic are handed off to the new access network 212 and the connection to the old access network 204 is removed. In preferred embodiments, both control traffic and user traffic are sent through the proxy server 208 prior to being sent to the GGSN 210 (or other appropriate node).

Thus, in one example implementation, a preferred embodiment call flow starts at a GPRS access network. The control traffic flows from the access network to a SGSN, then to the proxy server, then to a GGSN. The user traffic can either follow this path, or it can go directly from the SGSN to the GGSN.

When a user is using a WLAN access network, the control and data are preferably both anchored at the proxy server, and from there routed to the GGSN.

In preferred embodiments, the proxy server acts as a GGSN when connecting to a SGSN. Similarly it acts as a SGSN when connecting to a GGSN. When the mobile connects over GPRS networks, SGSN connects to proxy server, acting as a GGSN. The proxy server maps the APN information to identify the actual GGSN from an APN mapping table. The proxy server proxies the connection request from SGSN to the actual GGSN. So, the PDP context is setup between the SGSN and the home GGSN via the proxy server. All the control and data flow of this PDP context flow through the proxy server. Since the GTP allows for separation of control and data traffic, one optimization is to proxy server only the control traffic and the data traffic path (or the GTP-U tunnel) is directly setup between SGSN and GGSN. For the WLAN connection, the proxy server acts as tunnel termination gateway, with an IPSec tunnel from the client to the proxy server. In this case, the proxy server acts as a SGSN and connects to the actual GGSN. The proxy server handles both control and user data in this case.

Handover Using Proxy Server

Following is a discussion of one example embodiment showing a handover between access networks using the innovative system including a proxy server. Since, in preferred embodiments, the sessions are setup through the proxy server to a common gateway node, GGSN, seamless handover can be achieved between different wireless access data networks. The sequence of the events when a mobile node roams, for example, between GPRS network and WLAN are:

1. Client initiates the primary PDP context setup after it attaches to the GPRS network.
2. SGSN performs the GTP tunnel setup by sending a create PDP context request to proxy server, since proxy server is configured as the GGSN node for the selected APN.
3. Proxy server performs the APN mapping to identify the actual GGSN, which supports the requested service. The PDP context create request is proxied to this actual GGSN.
4. The network, in this process, performs authorization and authentication as described in 3GPP specification TS 24.008. The PDP context is setup between SGSN and GGSN through the proxy server, acting in the control plane. An IP address is assigned to the client by the GGSN.
5. The client can communicate with external network using the GGSN assigned PDP address. All the traffic flows between GGSN and client through SGSN.
6. Upon entering into a WLAN coverage area a connection setup is initiated between the client and WLAN network.
7. Proxy server performs authorization/authentication of the subscriber for WLAN access and initiates a PDP context switchover towards the actual GGSN.
8. The existing PDP context GTP-U tunnel is switched over from SGSN to the proxy server. From that point onwards, all the traffic flows through the proxy server over the WLAN.
9. When the mobile node leaves the WLAN coverage area, the GPRS session is updated on the attached SGSN. The SGSN create or updates the PDP context towards the proxy server.
10. The proxy server updates the PDP context information on GGSN that transfers the GTP-U tunnel from proxy server to the SGSN. The traffic flows through SGSN from that point onwards.

Seamless Roaming

Figure 3:
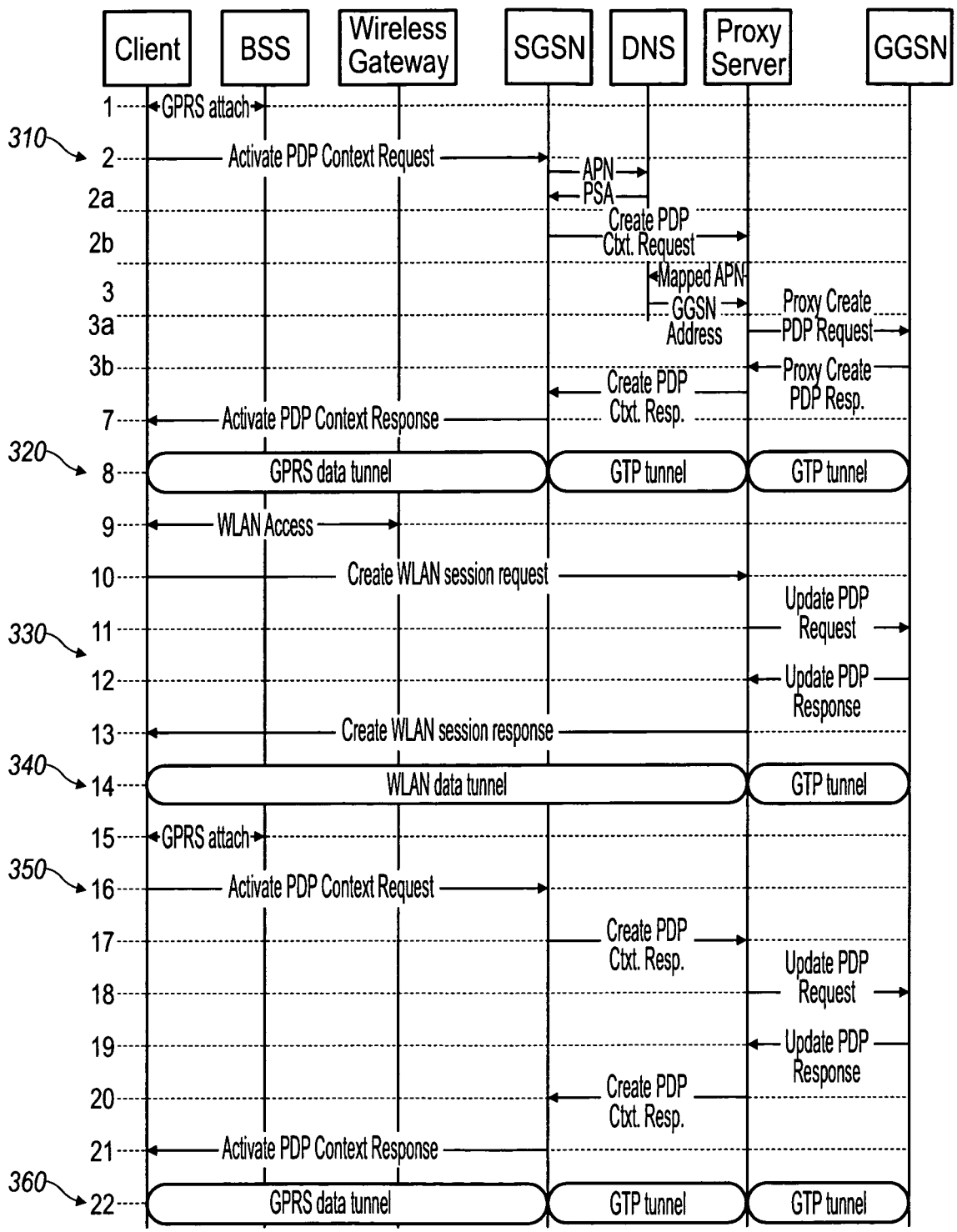
FIG. 3 shows a call flow consistent with implementing a preferred embodiment of the present innovations.

The call flows in this case are as shown in FIG. 3. Each of the steps indicated in the diagram are explained below:

GPRS Connection Setup

Figure 4:
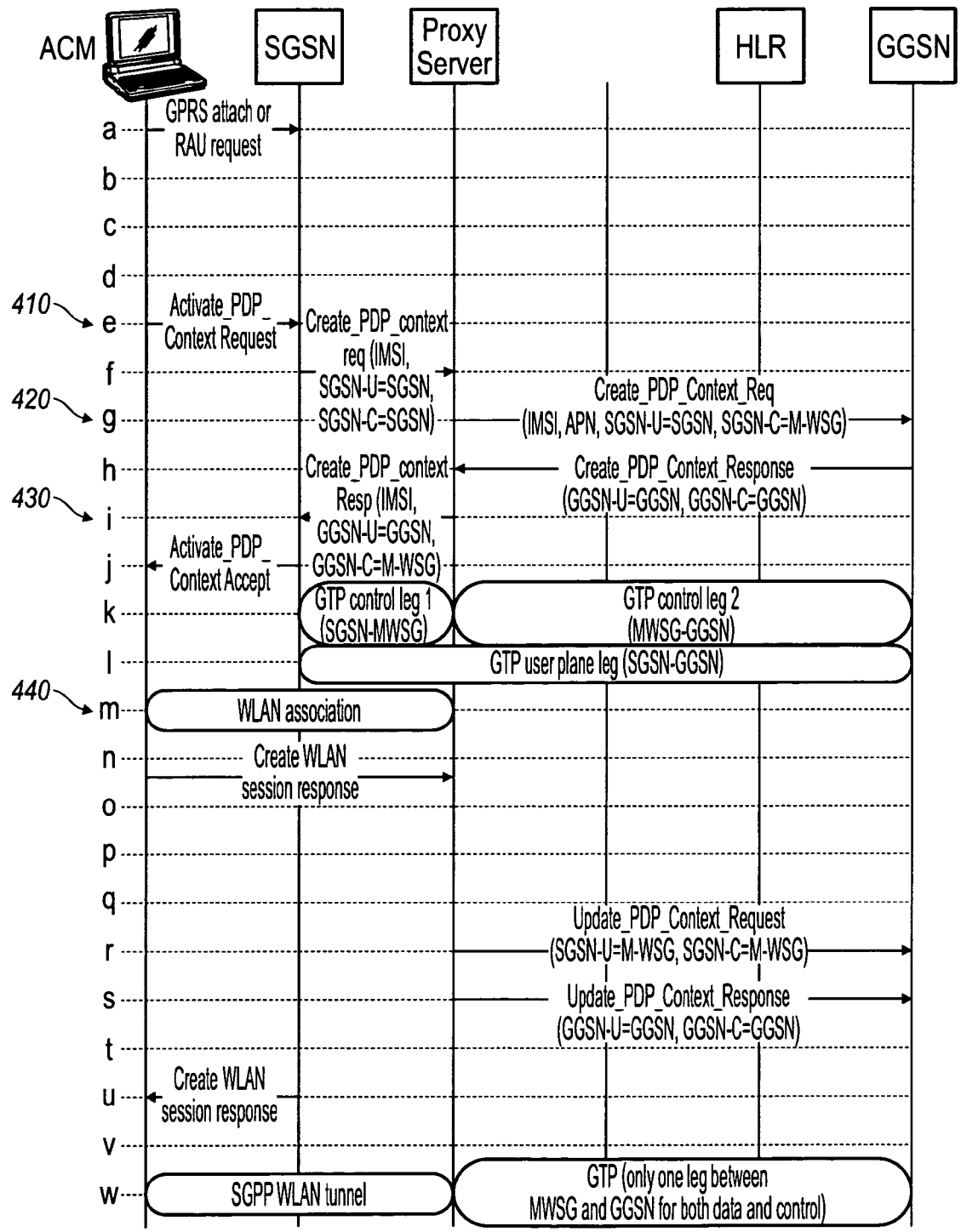
FIG. 4 shows a call flow consistent with implementing a preferred embodiment of the present innovations.

1. The mobile node attaches over the GSM air interface to initiate the GPRS session. The GPRS attach is made to the SGSN by providing the MN's Packet TMSI or IMSI, and the RAI. After having executed the GPRS attach, the MN is in READY state to activate the PDP contexts.
2. The MN sends an Activate PDP context Request message to the SGSN with all required parameters viz., NSAPI, TI, PDP type, optional PDP address, optional APN, QoS requested and any PDP configuration options. SGSN performs the security functions to authorize and authenticate user by interacting with HLR, not shown in the figure. After these security functions are completed, there is a DNS resolution (shown in steps 2a and 2b in FIG. 3) where in the input is APN and the response from the DNS is the proxy server address.
3. The SGSN performs the APN selection/GGSN resolution, and as a result, considering the proxy server as GGSN, sends a create PDP context request message to the proxy server, acting as a GGSN. The following minimum parameters are sent in the create request; PDP Type, APN, QoS Negotiated, TEID, NSAPI, MSISDN, Selection Mode, Charging Characteristics.
4. Proxy server identifies the APN value in the request and maps to actual APN using an internal APN mapping table. This mapped APN is used for identifying the actual GGSN for this service. A second DNS resolution occurs (shown in steps 3a and 3b in FIG. 3) where the mapped APN is the input and the response from the DNS is the GGSN address. Proxy server then proxies the original PDP context create request to this GGSN. In the case of data path optimization, where the data tunnel is directly between SGSN and GGSN, proxy server explicitly specifies the value for SGSN node for data as the actual SGSN IP address. This case is explicitly shown in FIG. 4. In FIG. 4, there are two separate data tunnels shown through which user and control traffic may travel. The proxy server is able to accomplish data path optimization by separating the user and control traffic.
5. GGSN validates the request and creates a new entry in its PDP context table and generates a charging Id. This allows GGSN to route PDP PDUs between the SGSN and the external packet data network. GGSN returns a create PDP context response with the approved values, including the dynamically assigned IP address.
6. Proxy server verifies the response received from GGSN and proxies back to SGSN.
7. The SGSN selects the Radio Priority and Packet flow Id based on the QoS negotiated. An activate PDP context accept message with the negotiated parameters (PDP Type, PDP Address, TI, QoS Negotiated, Radio Priority, Packet Flow Id and PDP configuration options) is sent to MN. The SGSN is now able to route PDP PDUs between the GGSN and MN.

GPRS Data Flow

8. The client uses the GGSN assigned PDP address as the IP address to communicate to other nodes. The traffic between the client and SGSN are transferred using standard GPRS mechanism. There are two GTP tunnels: GTP tunnel between SGSN and proxy server and GTP tunnel between proxy server and GGSN for both control and user traffic.

Roaming into WLAN Hotspot

The client is triggered either automatically (by detecting a preferred WLAN) or manually (explicitly initiation) to initiate a handover to WLAN. The process of setting up WLAN connection and handover of connection are as follows:

WLAN Connection Setup

9. The client associates to a WLAN access point over the 802.11 radio. AP (or the hotspot gateway) can perform any authorization and security functions, including EAPOL, WPA, for additional security.
10. Client sends a request to the proxy server to setup a secure connection by including the IMSI value and optional APN information. Proxy server performs the authentication of the client for WLAN access through standard procedures.
11. Proxy server identifies that a GTP tunnel exists for this IMSI and APN, towards the GGSN. To perform the tunnel switchover, proxy server sends an update PDP context request with the context parameters, defined in 3GPP specification TS29.060.
12. GGSN validates the update request and sends the update response to the proxy server. In this process any new QoS values can be negotiated due to change of access network.
13. Proxy server sends a session setup response to the client, including the IP address that was assigned by the GGSN during GTP tunnel setup through GPRS. This becomes possible because the proxy server is acting as an anchor for GPRS and WLAN traffic.
14. Now the client has flow paths to the same GGSN with different priority levels through different access network. There is no change in the IP address of the client since proxy server maintains the same IP address toward the client, thus no impact to the higher layer protocols. There is only one GTP tunnel between the proxy server and the GGSN and both control and user traffic are delivered in this GTP tunnel. The packets are sent over WLAN to proxy server, which tunnels them to the GGSN. GGSN de-capsulate the packets and routes to external network. Packets destined for the client arriving at the GGSN, are tunneled over the GTP tunnel to proxy server. The packet is de-capsulated at proxy server and forwarded to the client over the WLAN connection. The proxy server switches the traffic path between GPRS and WLAN. This way the entire traffic stream is handed over to the WLAN connection seamlessly.

Roaming Out of WLAN Hotspot—Handback to GPRS

15. When the MN roams out of the WLAN hotspot and the WLAN signal strength gets weaker below threshold level, client initiates the GPRS connection by doing the GPRS attach action as defined in step 1 above. Note that this step is optional if the mobile is already GPRS attached. In case mobile is GPRS attached and comes back to GPRS, then the mobile performs the routing area update procedure.
16. Client sends a create GPRS session request to SGSN. This is similar to step 2 above.
17. The SGSN sends a create PDP context request to proxy server acting as a proxy server as in step 3 above.
18. Proxy server verifies the request and checks for any existing PDP context (or GTP tunnel) for this IMSI. Since there is context associated with IMSI, proxy server sends an update PDP context request to the corresponding GGSN. The Proxy server IP address is used for both control and user plane tunnel end point.
19. GGSN updates the PDP context information and sends the update PDP context response to the proxy server.
20. Proxy server and sends the create PDP context response to SGSN.
21. SGSN responds to the client with the message received from proxy server. This is same as step 7 above.
22. The data from the client is now transferred over the GPRS connection to the same GGSN node, through the SGSN and proxy server. Since the session, as observed from any external node, didn't change, the session is seamlessly handed back to GPRS network. There are two GTP tunnels: GTP tunnel between SGSN and proxy server and GTP tunnel between proxy server and GGSN. It is again noted that user and control traffic can be separated, thereby following separate paths, or they can be transmitted along the same path.

A data flow illustration of one embodiment of this proxy server this is shown in FIG. 3. In this proxy-based handover without a separate data tunnel, the first step is to have the client connect to and create a PDP context with the proxy server for both control and user plane data. (Step 310). The next step is to have the proxy server establish the GTP tunnel to GGSN for both control and user plane data. With this procedure, all the data, both control and user traffic are transferred from SGSN to GGSN through proxy server. When the client enters to WLAN area, an undate PDP context request is made to the GGSN from proxy server where information regarding the WLAN area that the client has entered is transmitted (Step 330). Both control and user plane data path is handed over to proxy server from SGSN, and data flow is then made from the client through the proxy server to GGSN (Step 340). When the client leaves the WLAN area it attaches to the GPRS system again and updates the PDP context so that data flow will commence from the client through SGSN and proxy server to the GGSN.

Another data flow illustration of another embodiment of this proxy this is shown in FIG. 4. In this proxy-based handover with a separate data path, the first step is to have the client connect to and create a primary PDP context with the proxy server (Step 410). The next step is to have the proxy server to establish the GTP tunnel with GGSN (Step 420). The proxy server indicates to the GGSN that SGSN is the tunnel end point for user plane data and the proxy server itself is the tunnel end point for control plane data. The proxy server then indicates to the SGSN that GGSN is the tunnel end point for user plane data and the proxy server itself is the tunnel end point for control plane data (Step 430). After this procedure, there are separate routes for control and user plane data. The control traffic is routed in two GTP tunnels—GTP tunnel between SGSN and proxy server, and GTP tunnel between proxy server and GGSN. The user traffic is routed in one GTP tunnel between SGSN and GGSN. (step 430) When the client enters WLAN area, the client requests to create the WLAN session to the proxy server, where information regarding the WLAN area that the client has entered is transmitted (Step 440). Then the proxy server receives this request, it checks if there is a session for this user and this APN. If present, the proxy server sends the 'update PDP context request' to the GGSN. In this update PDP context request, the proxy server takes over the user plane data from SGSN, so that both control and user plane data is transferred through proxy server. An advantage of using this method is to proxy server only the control traffic through the proxy server when user is connected to GPRS. The data traffic will be directly tunneled between SGSN and GGSN, just like in a standard GPRS architecture, therefore reducing one hop for the user data. When the user is connected to WLAN, proxy server handles both control and user plane traffic. When the client leaves the WLAN area it must then attach to the GPRS system and update the PDP context so that user data flow will commence from the client through SGSN to GGSN, bypassing the proxy server. For the control traffic, the data will flow from the client through SGSN and proxy server to GGSN, making the proxy server the anchor point for control messages.

Figure 5:
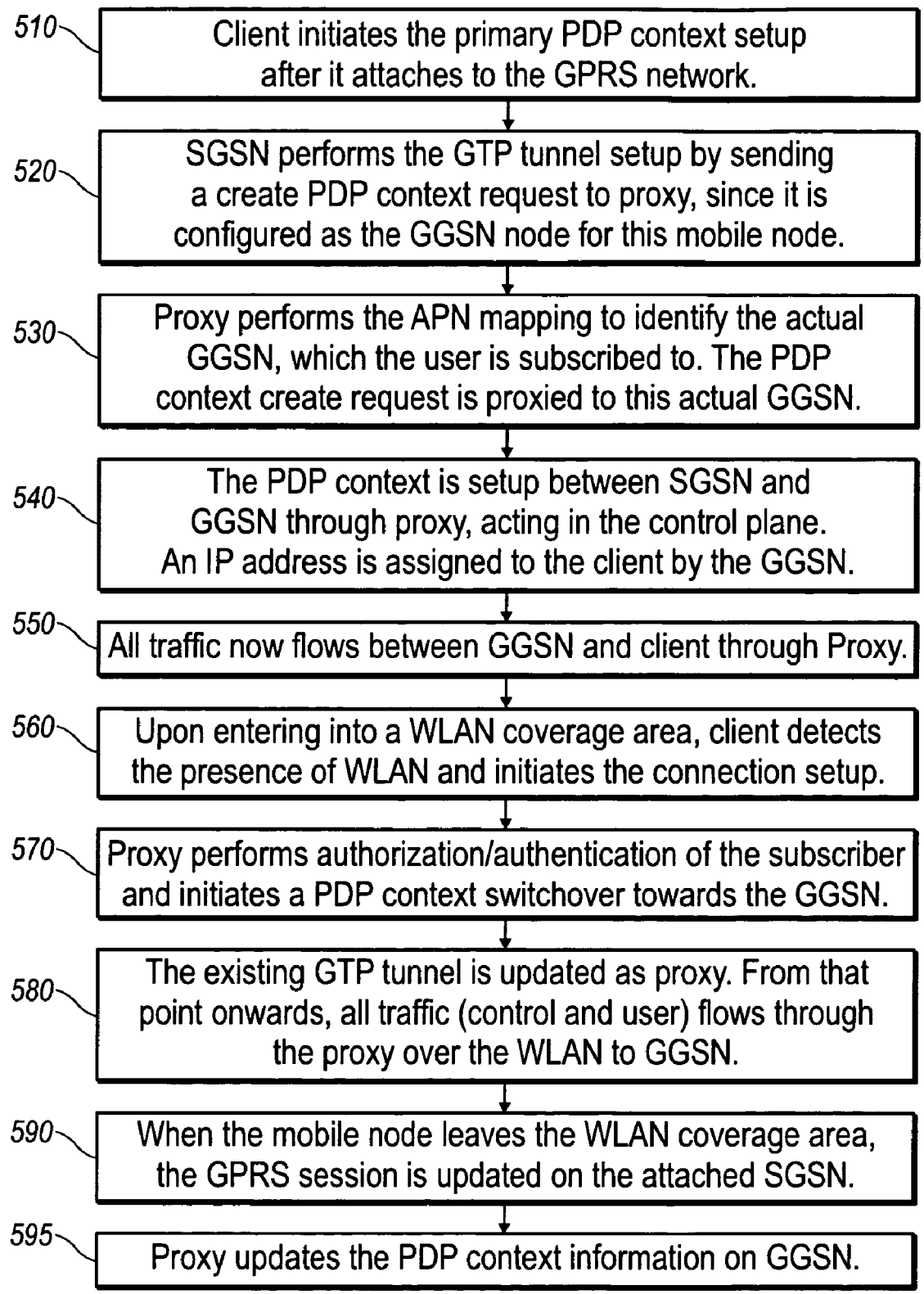
FIG. 5 shows an overview of the process steps for implementing a system consistent with a preferred embodiment of the present innovations.

In one example embodiment, sessions are setup through proxy server to a common gateway node, GGSN, and seamless handover can be achieved between different wireless data networks. FIG. 5 illustrates one sequence of events that can be followed to implement this embodiment. These are not the only steps that may be used to implement the invention, but are illustrative of the different types of steps that are available.

First, a client initiates the primary PDP context setup after it attaches to the GPRS network (Step 510). Then, a SGSN performs the GTP tunnel setup by sending a create PDP context request to WG, since it is configured as the GGSN node for this mobile node (Step 520). The network, in this preferred embodiment, performs authorization and authentication as described in 3GPP specification TS 24.008. Next, a WG performs the APN mapping to identify the actual GGSN, which the user is subscribed to. The Create PDP context request is proxied to this actual GGSN (Step 530). The PDP context is setup between SGSN and GGSN through WG, acting in the control plane. An IP address is assigned to the client by the GGSN (Step 540). The client can then communicate with external network using the GGSN assigned PDP address. All the traffic flows between GGSN and client through proxy server (Step 550). In this example embodiment, the proxy server becomes the anchor point for the traffic and has all the information on the user session. Alternatively, for routing optimization, the proxy server can anchor the control traffic only. In this case, the user traffic is routed from SGSN to GGSN directly. The proxy server still has all the necessary information of the user session, though, because it is anchoring the control traffic. Upon entering into a WLAN coverage area, client detects the presence of WLAN and initiates the connection setup toward the proxy server, which acts as a WG over WLAN network by providing the authentication credentials, including IMSI (Step 560). The proxy server performs authorization/authentication of the subscriber for WLAN access and initiates a PDP context switchover towards the GGSN (Step 570). The existing GTP tunnel endpoint for both user and control traffic is updated as proxy server. From that point onwards, all the user and control traffic flows through the proxy server over the WLAN (Step 580) to GGSN. When the mobile node leaves the WLAN coverage area, the GPRS session is updated on the attached SGSN (Step 590). The SGSN creates or updates the PDP context towards the proxy server. The proxy server then updates the PDP context information on GGSN (Step 595). If the proxy server is anchoring both user and control traffic, there is no additional action required from the proxy server except notifying the GGSN on the change of access network, because it is already acting as the tunnel end point for both user and control traffic toward GGSN. If the proxy server is anchoring only the control traffic, it updates the GGSN to change the user traffic tunnel end point becomes the SGSN.

According to a disclosed class of innovative embodiments, there is provided: A method of wireless communication, comprising the steps of: when a multifunction mobile client is in a GPRS session, routing GPRS control and user traffic to an SGSN; routing at least the GRPS control traffic to a GGSN through a proxy server transparently to the client; and routing the GPRS user traffic to a GGSN, either directly from the SGSN or through the proxy server.

According to a disclosed class of innovative embodiments, there is provided: A method of wireless communication, comprising the steps of: when a multifunction mobile client accesses a GPRS network using an IP-based access technology: routing control traffic and user traffic to a proxy server; and transparently to the mobile client, routing the control traffic and user traffic from the proxy server to a GGSN.

According to a disclosed class of innovative embodiments, there is provided: A wireless network system, comprising: a proxy server adapted to support both GPRS traffic and a non-GPRS and IP-based traffic from a mobile client and to communicate with a GGSN through GPRS protocol; wherein when the mobile client uses a GPRS access network: GPRS control traffic is sent to the GGSN through a proxy server, transparently to the mobile client; and GPRS user traffic is sent to the GGSN either through the proxy server or directly from an SGSN; and wherein when the mobile client uses a non-GPRS, IP-based access network: both control traffic and user traffic are sent to the proxy server; and transparently to the mobile client, both control traffic and user traffic are routed to the GGSN.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given.

For example, the present innovations can be implemented, consistent and within the scope of the concepts disclosed herein, using any number of network types to maintain consistent connectivity while moving into and out of a network coverage area.

Another example, that the present innovations can be implemented using, consistent and within the scope of the concepts disclosed herein, is the EDGE network WiFiMAX technology to enable constant connectivity.

Another example, that the present innovations can be implemented using, consistent and within the scope of the concepts disclosed herein, is use of a router or other device to act as the proxy server as a standalone unit away from the GGSN.

Another example, that the present innovations can be implemented using, consistent and within the scope of the concepts disclosed herein, is use of integrated telecommunications system to act as the proxy server away from the GGSN.

Another example, that the present innovations can be implemented using, consistent and within the scope of the concepts disclosed herein, is use of a proxy server as a data distribution point where data is separated into two separate streams and the streams are optimized by the proxy server for specific connections.

Additional general background, which helps to show variations and implementations, may be found in the following publications, all of which are hereby incorporated by reference: 3*G Mobile Networks*, S. Kasera, N. Narang, McGraw-Hill, 2005.

ABBREVIATIONS

The following is a list of abbreviations and meanings determined from the application. These abbreviations are intended only as a source of clarity and not intended to limit the scope of the application, nor are they intended to contradict ordinary meaning to those of skill in the art.

| Abbreviation | Words Represented By Abbreviations |
|---|---|
| 3GPP | 3rd Generation Partnership Project |
| AP | Access Point |
| APN | Access Point Name |
| BSC | The Base Station Controller |
| BSS | The Base Station Subsystem |
| CN | Correspondent Node |
| COA | Care of Address |
| ESS | Electronic Switching System |
| FA | Foreign Agent |
| GGSN | Gateway GPRS Support Node |
| GPRS | General Packet Radio Services |
| GSM | The Global System for Mobile Communications |
| GSN | GPRS Support Node |
| GTP | GPRS Tunneling Protocol |
| HA | Home Agent |
| IMSI | International Mobile Subscriber Identity |
| IPv4 | Version 4 of the Internet Protocol |
| IPv6 | Version 6 of the Internet Protocol |
| LAN | Local Area Network |
| MIP | Mobile IP |
| MN | Mobile Node |
| MSISDN | Mobile Station Integrated Services Digital Network |
| MT | Message Transfer |
| NSAPI | Network Service Access Point Identifier |
| PDP | Packet Data Protocol |
| PDU | Protocol Data Unit |
| QoS | Quality of Service. |
| SGSN | Serving GPRS Support Node |
| TEID | Terminal Equipment ID |
| TFT | The Traffic Flow Template |
| TI | Tunnel Identifier |
| TOS | Type of Service |
| TS | Technical Specification |
| UMTS | Universal Mobile Telecommunications System |
| WGS | Wireless Gateway Server |
| Wi-Fi | Wireless Fidelity |
| WLAN | Wireless Local Area Network |

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method of wireless communication for a multifunction mobile client, comprising the steps of:
   when the multifunction mobile client is in a General Packet Radio Service (GPRS) session,
      routing GPRS control traffic to a gateway support node through a proxy server transparently to the client; and
      routing GPRS user traffic between a serving support node and the gateway support node either directly or through the proxy server;
   when the multifunction mobile client switches to non-GPRS, Internet Protocol (IP)-based access network during a GPRS session,
      if only GPRS control traffic is anchored to the proxy server, causing the proxy server to command the gateway support node to switch the GPRS user traffic from the serving support node to the proxy server; or
      if GPRS control and user traffic are anchored to the proxy server, causing the proxy server to update the gateway support node, the proxy server maintaining control of the GPRS session in a direction toward the gateway support node while switching access networks;
   wherein the proxy server maintains a same IP address for the client during the GPRS session and a non-GPRS session;
   wherein the proxy server establishes a tunnel to the multifunction mobile client for carrying packets to the client, and
   wherein before and after switching to the non-GPRS network, addresses associated with an application layer of the multifunction mobile client are the same.

2. The method of claim 1, wherein the route of the GPRS user traffic is determined at the proxy server and the route information becomes available to the serving support node and the gateway support node from the proxy server.

3. The method of claim 2, wherein the route of the GPRS user traffic is specified by a tunnel end point provided by the proxy server,
   wherein if the serving support node is specified as the tunnel end point for user traffic, then the GPRS user traffic is routed from the serving support node directly to gateway support node bypassing the proxy server, and if the proxy server is specified as the tunnel end point for user traffic, then the user traffic is routed from the serving support node to the gateway support node through the proxy server.

4. The method of claim 1, wherein the routing of either GPRS control traffic or GPRS control and user traffic from the serving support node to the proxy server happens through an address resolution mechanism internal to an address resolution node, accessed by the serving support node.

5. The method of claim 1, wherein the routing of either GPRS control traffic or GPRS control and user traffic from the proxy server to the gateway support node happens through an address mapping mechanism and an address resolution mechanism internal to the proxy and an address resolution node, accessible by a proxy.

6. The method of claim 1, wherein the GPRS user traffic route can be changed any time by updating a user traffic tunnel end point to be either the proxy server or the serving support node.

7. The method of claim 1, wherein the IP-based access network is a wireless local area network.

8. The method of claim 1, wherein access networks can be changed, while maintaining service continuity, by the proxy server maintaining control of the GPRS session toward the gateway support node while switching the access networks.

9. A method of wireless communication for a multifunction mobile client, comprising the steps of:
   when a multifunction mobile client accesses a General Packet Radio Service (GPRS) network using an Internet Protocol (IP)-based access technology:
   routing control traffic and GPRS user traffic to a proxy server; and
   transparently to the multifunction mobile client, routing the GPRS control traffic and user traffic from the proxy server to a gateway support node;
   when the multifunction mobile client switches to non-GPRS, IP-based access network during a GPRS session:
   causing the proxy server to update the gateway support node;
   causing the proxy server to maintain control of the user session in a direction toward the gateway support node while switching access networks;

causing the proxy server to maintain a same IP address for the client during a GPRS session and a non-GPRS session; and causing the proxy server to establish a tunnel to the multifunction mobile client;

wherein before and after switching to the non-GPRS network, addresses associated with an application layer of the multifunction mobile client are the same.

10. The method of claim 9, further comprising the steps of:

when the multifunction mobile client switches to a GPRS access technology, routing control and user traffic from the mobile client to a serving support node; and transparently to the multifunction mobile client, routing at least GPRS control traffic from the serving support node to the proxy server; and routing the GPRS user traffic to the gateway support node, either directly from the serving support node or through the proxy server.

11. The method of claim 10, wherein the route of the GPRS user traffic is determined at the proxy server and the route information becomes available to the serving support node and the gateway support node by the proxy server.

12. The method of claim 10, wherein the GPRS user traffic route can be changed any time by updating a user traffic tunnel end point to be either the proxy server or the serving support node.

13. The method of claim 10, wherein the route of the GPRS user traffic is specified by a tunnel end point provided by the proxy server, where if the serving support node is specified as the tunnel end point for user traffic, then the user traffic is routed from the serving support node directly to the gateway support node bypassing the proxy server, and wherein if the proxy server is specified as the tunnel end point for user traffic, then the user traffic is routed from the serving support node to the gateway support node through the proxy server, thereby separating the control and user traffic.

14. The method of claim 10, wherein the routing of traffic from the proxy to the gateway support node happens using an address mapping mechanism and an address resolution mechanism internal to the proxy server and an address resolution node, transparently to the mobile client.

15. The method of claim 9, wherein access networks can be changed while maintaining service continuity by the proxy server maintaining control of a GPRS session toward the gateway support node and switching access networks upon handover.

16. A wireless network system, comprising:

a proxy server adapted to support both General Packet Radio Service (GPRS) traffic and a non-GPRS and Internet Protocol (IP)-based traffic from a mobile client and to communicate with a gateway support node through a GPRS protocol;

wherein when the mobile client uses a GPRS access network, the system configured to:

send GPRS control traffic to the gateway support node through a proxy server, transparently to the mobile client; and send GPRS user traffic to the gateway support node either through the proxy server or directly from a serving support node; and wherein when the mobile client uses a non-GPRS, IP-based access network, the system configured to:

send both GPRS control traffic and user traffic to the proxy server; and route, transparently to the mobile client, both control traffic and user traffic to the gateway support node;

wherein the proxy server is configured to maintain control of the user session in a direction toward the gateway support node while switching access networks;

wherein the proxy server is configured to maintain a same IP address for the client during the GPRS session and the non-GPRS session;

wherein the proxy server is configured to establish a tunnel to the client or carrying packets to the client;

wherein before and after switching to the non-GPRS network, addresses associated with an application layer of the mobile client are the same.

17. The system of claim 16, wherein the routing to the proxy server is by use of an address resolution mechanism internal to an address resolution node and the routing from the proxy server to the gateway support node is by use of an address mapping mechanism and an address resolution mechanism internal to the proxy and the address resolution node.

18. The system of claim 16, wherein when the mobile client uses a GPRS access network, the routing of the GPRS user traffic is decided by proxy by use of specifying a tunnel end point of the user traffic.

19. The system of claim 16, wherein when the mobile client uses a GPRS access network, the GPRS user traffic is routed to the gateway support node through the proxy server specified as a tunnel end point of the user traffic; and traffic is routed directly to the gateway support node if the serving support node is specified as the end point of the user traffic.

20. The system of claim 16, wherein when the mobile client uses a GPRS network, the GPRS user traffic route can be changed any time by updating a tunnel end point of the user traffic; where the tunnel end point of the user traffic can be either the proxy server or serving support node.

21. The system of claim 16, wherein when the mobile client changes from a first access network of a first type to a second access network of a second type, the proxy server acts as an anchor point for at least a control traffic and maintains the route toward the gateway support node and switches the control path between two access networks.

22. The system of claim 16, wherein when the mobile client changes from a first access network of a first type to a second access network of a second type, the GPRS user traffic is routed according to the type of the access network.

23. The system of claim 17, wherein the first access network type is an access network, and wherein a second access network type is a WLAN access network.

24. The system of claim 16, wherein the client's IP address does not change when access networks are changed by the proxy server acting as an anchor point and maintaining control of the user session and keeping the IP address the same upon access network change.

25. The system of claim 16, wherein access networks can be changed while maintaining service continuity by the proxy server acting as an anchor point and maintaining the control of the user session toward the gateway support node and switching between the access networks.

* * * * *